United States Patent
Bertin De La Hautiere et al.

(10) Patent No.: US 9,316,739 B2
(45) Date of Patent: Apr. 19, 2016

(54) METHOD OF MONITORING THE INTEGRITY OF RADIO-NAVIGATION STATIONS IN A SATELLITE BASED AUGMENTATION SYSTEM

(71) Applicant: THALES, Neuilly-sur-Seine (FR)

(72) Inventors: Gonzague Bertin De La Hautiere, Toulouse (FR); Nidhal Dahman, Toulouse (FR)

(73) Assignee: THALES, Courbevoie (FR)

( * ) Notice: Subject to any disclaimer, the term of this patent is extended or adjusted under 35 U.S.C. 154(b) by 684 days.

(21) Appl. No.: 13/954,642

(22) Filed: Jul. 30, 2013

(65) Prior Publication Data
US 2014/0035778 A1 Feb. 6, 2014

(30) Foreign Application Priority Data

Aug. 3, 2012 (FR) ...................................... 12 02181

(51) Int. Cl.
*G01S 19/20* (2010.01)
*G01S 19/03* (2010.01)
*G01S 19/38* (2010.01)
*G01S 19/02* (2010.01)
*G01S 19/07* (2010.01)

(52) U.S. Cl.
CPC ................. *G01S 19/38* (2013.01); *G01S 19/02* (2013.01); *G01S 19/07* (2013.01)

(58) Field of Classification Search
CPC ................................. G01S 19/20; G01S 19/22
USPC ........ 342/357.4, 357.58, 357.61, 357.77, 173
See application file for complete search history.

(56) References Cited

U.S. PATENT DOCUMENTS 7,019,688 B1  3/2006  Reuter et al.

FOREIGN PATENT DOCUMENTS

WO     2006134412 A1    12/2006

OTHER PUBLICATIONS

Gang Xie, "Integrity Design and Updated Test Results for the Stanford LAAS Integrity Monitor Testbed", Proceedings of the ION National Technical Meeting, the Institute of Navigation, Jun. 11, 2001, pp. 681-693, USA, XP002395458.
Jiyun Lee, et al., "LAAS Sigma-Mean Monitor Analysis and Failure-Test Verification", Proceedings of the ION National Technical Meeting, the Institute of Navigation, Jun. 11, 2011, pp. 694-704, USA, XP002395457.
D. Ilcev, et al, "European Geostationary Navigation Overlay Service (EGNOS)", 1st Africa Conference Proceedings, May 11, 2011, pp. 1-14, IEEE, XP032077102.
J.Westbrook, et al., "EGNOS Central Processing Facility Architecture and Design", GNSS 2000 Conference, May 1-4, 2000, pp. 1-18, URL:http://www.egnos-pro.esa.int/Publications/GNSS%202000/GNSS2000_cpf.pdf, XP002676599.

*Primary Examiner* — Dao Phan
(74) *Attorney, Agent, or Firm* — Baker & Hostetler LLP

(57) ABSTRACT

A method of monitoring the integrity of stations for observing radio-navigation signals in a satellite based augmentation system SBAS comprises: defining a geographical zone comprising a plurality of observation stations, calculating, for each observation station of the zone and for each line of sight between the station and a satellite, the discrepancy between the theoretical pseudo-distance D and the measured pseudo-distance D', calculating the average m of the discrepancies D–D' over the zone for at least one satellite in visibility of the zone, validating the integrity of at least one observation station of the zone if the discrepancy, for the station and for at least one line of sight between the station and a satellite, is less than or equal to the average that is multiplied by a predetermined exclusion threshold, and excluding this observation station in the converse case.

13 Claims, 10 Drawing Sheets

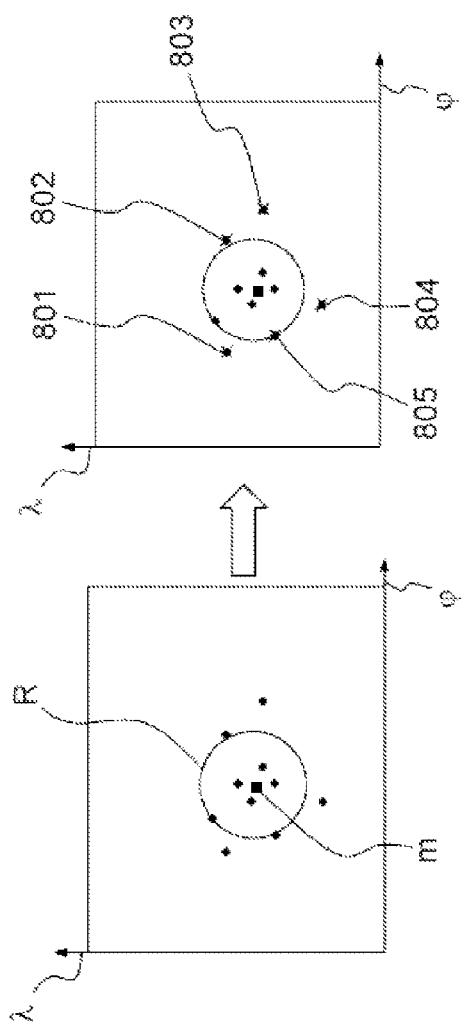
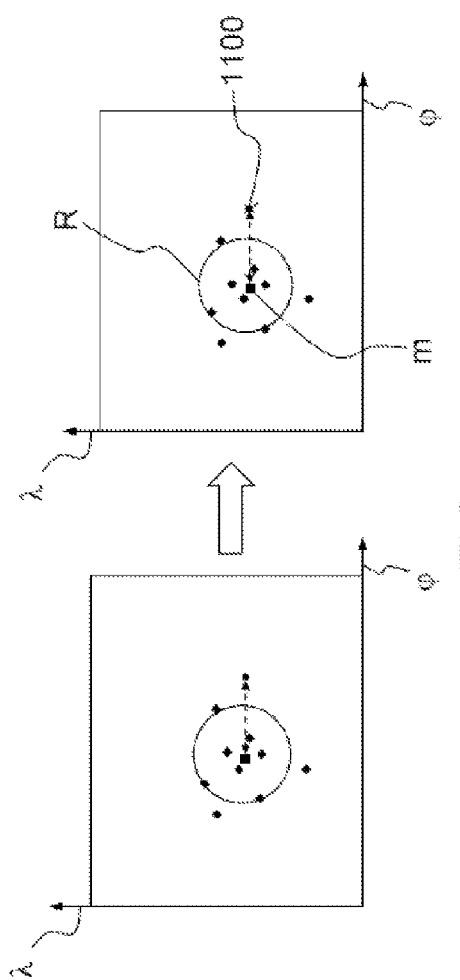

US 9,316,739 B2

METHOD OF MONITORING THE INTEGRITY OF RADIO-NAVIGATION STATIONS IN A SATELLITE BASED AUGMENTATION SYSTEM

CROSS-REFERENCE TO RELATED APPLICATION

This application claims priority to foreign French patent application No. FR 1202181, filed on Aug. 3, 2012, the disclosure of which is incorporated by reference in its entirety.

FIELD OF THE INVENTION

The invention relates to the field of systems for augmenting performance and the availability of satellite navigation systems, known by the acronym SBAS for "Satellite Based Augmentation Systems".

The invention pertains more precisely to a method of monitoring the integrity of external radio-navigation stations for their integration into an SBAS system.

BACKGROUND

FIG. 1 shows diagrammatically, in a schematic, the global architecture of an SBAS system according to the prior art. Such a system is adapted for producing augmentation data on the basis of measurements carried out on the navigation signals 101 emitted by a plurality of radio navigation satellites NAV. The measurements and data originating from the radio navigation satellites NAV are collected by a plurality of observation stations RIMS and then transmitted 102, at a given tempo, to one or more monitoring and processing centres CPF. These carry out, on the basis of the measurements received, an estimation of the differential corrections to be applied to the radio navigation signal and then elaborate augmentation messages, which include these corrections and are thereafter transmitted 103 to a terrestrial navigation station NLES. The station NLES receives the augmentation messages and transmits them 104 to an augmentation satellite SAT for subsequent broadcasting 105 to the users U and to the observation stations RIMS. The users U may be receivers situated on the ground or aboard a carrier, for example an aircraft. The augmentation messages are, for this purpose, integrated, in a manner similar to the navigation messages, into a navigation signal compatible with a satellite based radio-navigation system or GNSS (Global Navigation Satellite System). The augmentation satellite SAT may be a geostationary satellite or a satellite with high orbit HEO or else a satellite with inclined geostationary orbit of IGSO type (Inclined Geosynchronous Satellite Orbit). This is for example a satellite of the EGNOS (European Geostationary Navigation Overlay Service) European system. The station NLES performs integrity monitoring of the messages received, transmitted by the monitoring and processing centres CPF, with the messages broadcast by the augmentation satellite SAT on the downlink.

In a satellite based augmentation system, the observation stations RIMS, tasked with carrying out measurements on the radio-navigation signals received, are usually of limited number. For example, the EGNOS European SBAS system comprises only thirty-seven observation stations in its currently operational version and two other stations are presently undergoing deployment. Likewise, the WAAS American SBAS system comprises thirty-eight observation stations. A limited number of observation stations implies a limited availability in respect of the service associated with the SBAS system, in particular in the geographical zones where the service must be ensured but which comprise only few stations. Furthermore, the number of observation stations directly impacts the performance of the system in terms of precision of the modellings carried out on the basis of the measurements collected. In particular the modellings of the orbits of the satellites as well as the ionosphere that are provided by an SBAS system will be all the more precise the higher the number of stations.

To increase the number of available observation stations, the idea underlying the invention consists in using, in place of or as a supplement to the observation stations RIMS dedicated to the SBAS system, external stations whose prime function is not the carrying out of measurements destined for a processing centre CPF of an SBAS system. In particular, such external stations may be provided by bodies that manage collaborative networks of radio-navigation stations. For example, the bodies IGS (International GNSS Service), EUREF (European Reference) IGN (French national geographical Institute) respectively offer the collaborative networks IGS global network, EPN (EUREF Permanent Network) and RGP (Permanent Geodesic Network).

Such collaborative networks comprise a large number of GNSS stations, for example the RGP network comprises 300 stations, however the measurements provided by these stations are not guaranteed. If a station exhibits a problem in its operation and transmits an aberrant measurement, this may disturb the global operation of the system.

To be compatible with the integrity requirements demanded by an SBAS system, the data provided by the stations external to the said system, acting instead of the observation stations RIMS, must be monitored in order to comply with the specified integrity level.

The known solutions making it possible to perform integrity monitoring of the measurements received by the processing centre CPF are of two types.

A first solution consists in using an item of information about the quality of the radio-navigation signal received by the observation stations RIMS so as to filter the aberrant measurements. Such an item of information regarding quality is calculated by the internal observation stations RIMS of a standard SBAS system and transmitted to the processing centre CPF. However, stations external to the SBAS system do not integrate such a calculation and without an item of information regarding quality, the filtering method implemented by the processing centre CPF is not possible.

A second solution consists in using a monitoring function in parallel with the function tasked with detecting integrity defects as is conventionally done for example in a monitoring and processing centre of the EGNOS European augmentation system. Such a solution allows the use in confidence of an SBAS navigation message but results in a reduction in availability since it involves filtering all the measurements arising from one and the same satellite or originating from a given zone of the ionosphere.

SUMMARY OF THE INVENTION

The invention affords a solution to the problem of integrity monitoring of the measurements provided by a radio-navigation station external to an SBAS system.

It consists in integrating, upstream of the monitoring and processing centre CPF, a verification module adapted for validating the integrity of the external stations and in excluding the stations for which an integrity defect is detected.

The invention makes it possible to increase the availability of the SBAS service with respect to the known solutions since it carries out a filtering by exclusion of the observation stations on a case by case basis and not a filtering of the set of measurements arising from signals originating from one and the same satellite and one and the same zone of the ionosphere.

Thus, the subject of the invention is a method of monitoring the integrity of stations for observing radio-navigation signals in a satellite based augmentation system SBAS comprising at least the following steps:

Defining at least one geographical zone comprising a plurality of observation stations, Calculating, for each observation station of the said zone and for each line of sight between the said station and a satellite, the discrepancy between the theoretical pseudo-distance D and the measured pseudo-distance D', Calculating the average m of the said discrepancies D–D' over the said zone for at least one satellite in visibility of the said zone, Validating the integrity of at least one observation station of the said zone if the discrepancy between the theoretical pseudo-distance D and the measured pseudo-distance D', for the said station and for at least one line of sight between the said station and a satellite, is less than or equal to the said average that is multiplied by a predetermined exclusion threshold, and excluding this observation station in the converse case.

In a variant embodiment of the invention, the said average m is calculated over the set of satellites in visibility of the said zone.

In another variant embodiment of the invention, the integrity of the observation stations of the said zone is validated (602) if all the discrepancies between theoretical pseudo-distance D and measured pseudo-distance D' for all the line of sight are less than or equal to the said average that is multiplied by a predetermined exclusion threshold.

According to a particular aspect of the invention, the theoretical pseudo-distance D is calculated on the basis of the knowledge of the positions of the satellites and of the observation stations and the measured pseudo-distance D' is calculated by the observation stations on the basis of the radio-navigation signals received.

The said zone can be of fixed size or can be a circle of variable radius centred on a given observation station, termed the reference station. The radius of the said zone can be configured so that each zone comprises the same number N of stations.

In a variant embodiment of the invention, within a zone, only the integrity of the reference station is validated.

The exclusion threshold can be fixed or dependent on the maximum number of observation stations per zone to be excluded. It can also be configured so as to minimize the probability of false alarm and the probability of non-detection over the number of excluded observation stations.

According to a particular aspect of the invention, the said observation stations form part of a collaborative network of stations.

The subject of the invention is also a monitoring and processing centre for satellite based augmentation system SBAS comprising means for monitoring the integrity of stations for observing radio-navigation signals, the said means being adapted for implementing the method according to the invention.

The subject of the invention is also a satellite based augmentation system SBAS comprising a plurality of observation stations whose integrity is not guaranteed and at least one monitoring and processing centre according to the invention.

BRIEF DESCRIPTION OF THE DRAWINGS

Other characteristics and advantages of the present invention will be more apparent on reading the description which follows in relation to the appended drawings which represent.

DETAILED DESCRIPTION

Figure 1:
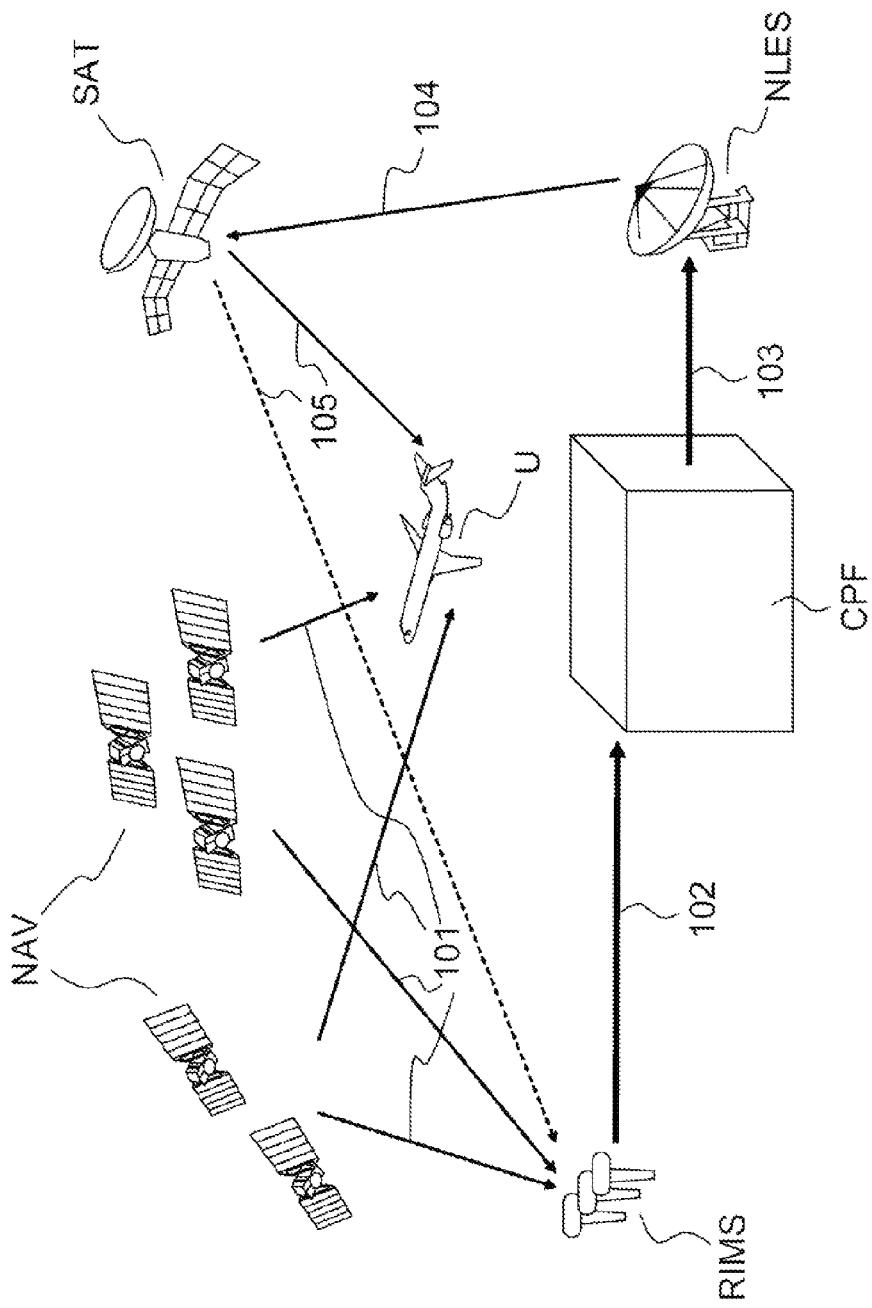
FIG. 1, a schematic of an SBAS augmentation system according to the prior art.
Figure 2:
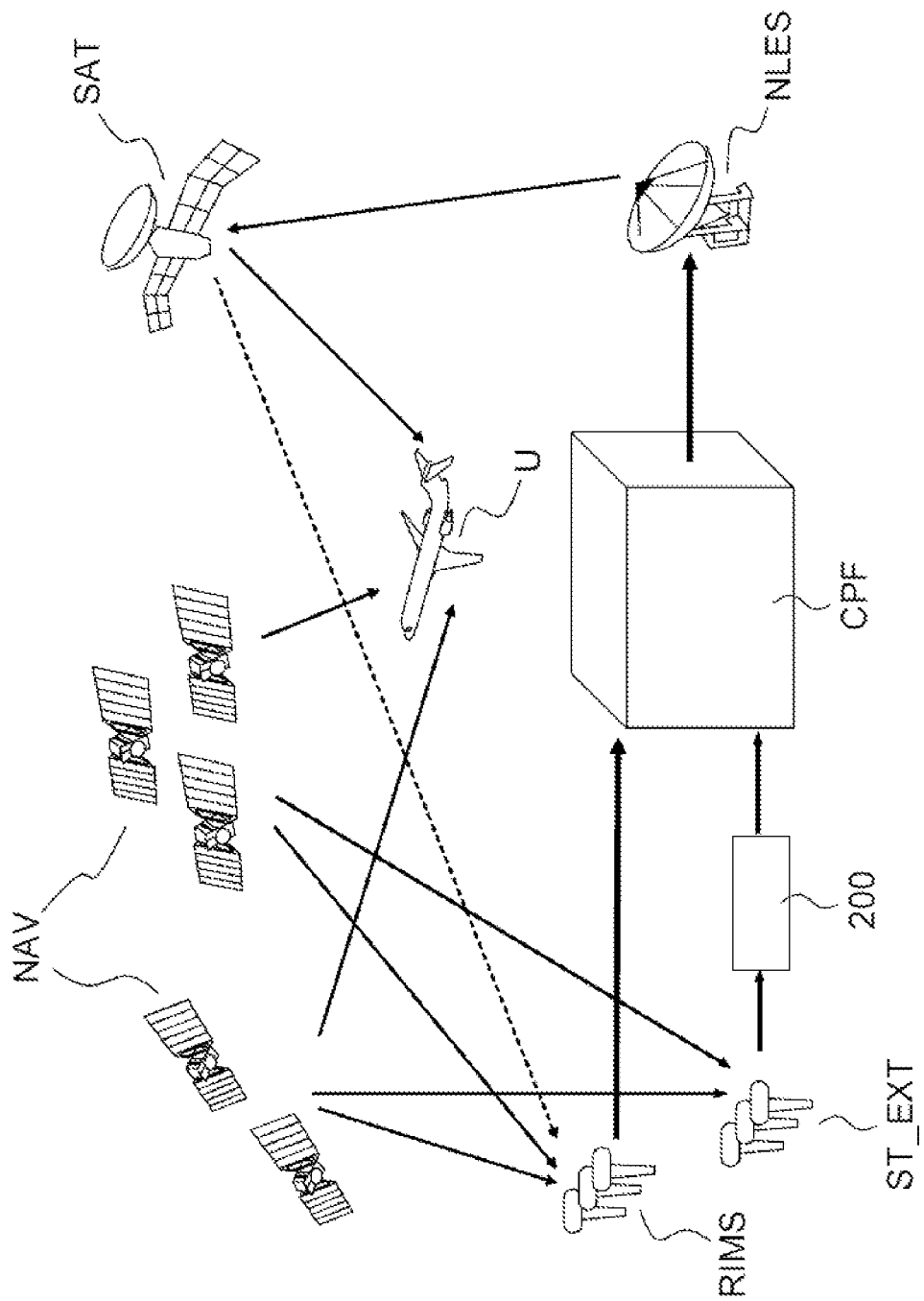
FIG. 2, a schematic of an SBAS augmentation system adapted according to the invention, FIG. 3, a schematic of a variant embodiment of the SBAS augmentation system according to the invention described in FIG. 2, FIG. 4, a functional diagram of the architecture of a monitoring and processing centre of an SBAS system according to the prior art, FIG. 5, a functional diagram of the architecture of a monitoring and processing centre of an SBAS system adapted according to the invention, FIG. 6, a diagram illustrating the implementation of the method of monitoring the integrity of measurement stations of an SBAS system according to the invention, FIG. 7, an exemplary grouping by zones of the measurement stations used by an SBAS system according to a first variant of the invention, FIG. 8, an example illustrating the mechanism of exclusions of unreliable measurement stations according to the first variant of the invention, FIG. 9, a first exemplary grouping by zones of the measurement stations used by an SBAS system according to a second variant of the invention, FIG. 10, a second exemplary grouping by zones of the measurement stations used by an SBAS system according to the second variant of the invention, FIG. 11, an example illustrating the mechanism of exclusions of unreliable measurement stations according to the second variant of the invention.

FIG. 2 represents a diagram of an SBAS augmentation system adapted according to the invention. The elements common with the SBAS system according to the prior art represented in FIG. 1 are identified by the same references. In replacement for or as a supplement to the observation stations RIMS adapted to the SBAS system, a plurality of stations ST_EXT external to the SBAS system, whose positions are known, are integrated into the SBAS system according to the invention. The expression external stations is understood to mean receivers of radio-navigation signals which are not dedicated to a use within the framework of an SBAS augmentation system. The operation of such receivers is therefore not guaranteed and their reliability level is lower than that of the observation stations RIMS dedicated to a use at the core of an SBAS augmentation system. The external stations ST_EXT receive the radio-navigation signals emitted by one or more radio-navigation satellites NAV and transmit the measurements associated with these signals to a processing centre CPF. The transmission of the measurements can be done via the Internet network since collaborative networks (IGS,EU-REF,RGP) offer this type of service. A module 200 for verifying the signals transmitted by the external stations ST_EXT is inserted upstream of the processings carried out in the processing centre CPF. This module is advantageously integrated into the processing centre CPF. It carries out integrity monitoring making it possible to construct a collective confidence in relation to the external stations ST_EXT and to exclude those which are judged unreliable according to a criterion defined subsequently.

Figure 3:
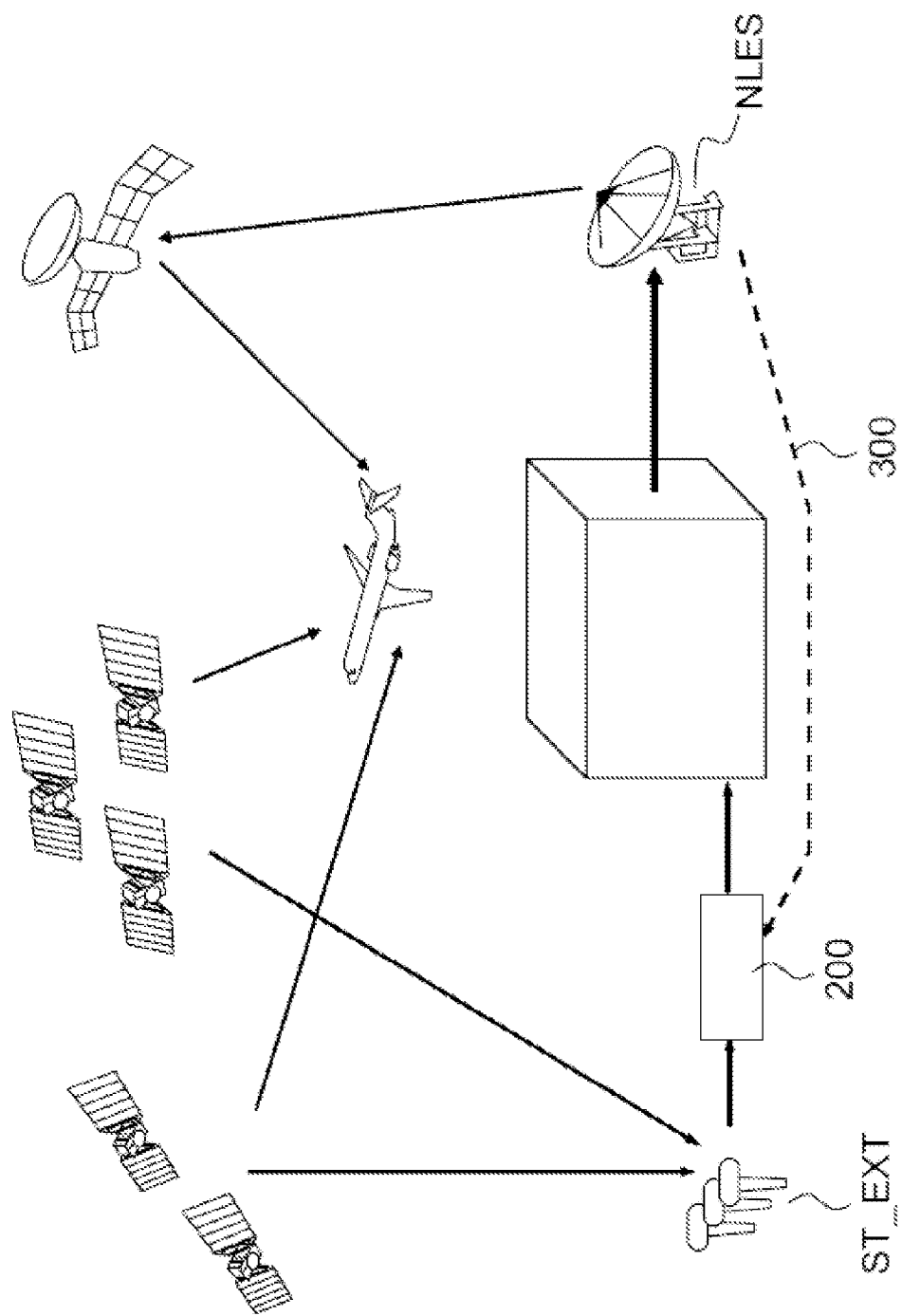

FIG. 3 represents a variant embodiment of the SBAS system according to the invention, in which only external stations ST_EXT are used with the exclusion of the observation stations RIMS. In contradistinction to the observation stations RIMS, the stations ST_EXT external to the SBAS system are not adapted to such a system and therefore cannot receive the augmentation messages broadcast by the augmentation satellite SAT. In this case, the augmentation messages can be directly transmitted by the terrestrial navigation station NLES to the processing centre CPF via a return channel 300.

Figure 4:
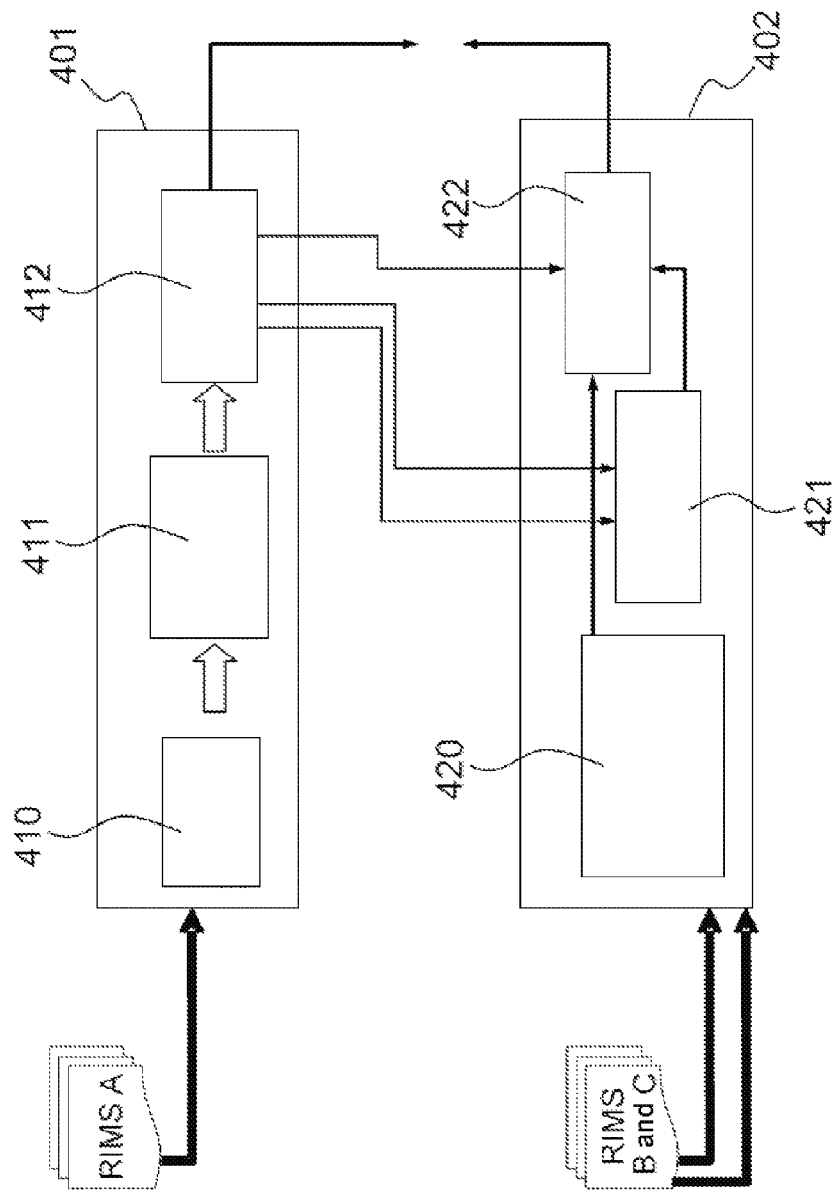

FIG. 4 represents a functional diagram of the architecture of a monitoring and processing centre CPF of an SBAS system according to the prior art.

This architecture is mainly composed of a first processing module 401 or "Processing Set" and of a second monitoring module 402 or "Check Set".

The first processing module 401 receives measurements originating from so-called type A observation stations RIMS. The second processing module 402 receives measurements originating from so-called type B observation stations RIMS. The observation stations RIMS of types A and B transmit the same information to the monitoring and processing centre CPF, namely a measurement of the pseudo-distance between the station and each satellite in sight of the station, the navigation message and Doppler measurements, signal-to-noise ratio and carrier code coherence. Furthermore each station also transmits an item of information about the quality of the signals that it receives.

The processing module 401 comprises a first function 410 for filtering the measurements transmitted by the stations RIMS A on the basis of the item of information regarding quality of the signal. The measurements considered unreliable are eliminated from the rest of the calculations. The processing module 401 furthermore comprises a function 411 for calculating corrections and an item of information about the integrity of the measurements and a function 412 for the elaboration of the augmentation message.

The monitoring module 402 comprises a first function 420 for filtering the measurements transmitted by the stations RIMS B, which operates in a manner similar to the function 410 for filtering of the processing module 401. The monitoring module 402 furthermore comprises a first function 421 for monitoring the reliability of the message generated by the processing module 401 and a second monitoring function 422 which verifies the proper incorporation, into the augmentation message, of the information produced by the first monitoring function 421. The first monitoring function 421 performs a comparison between the positioning information established in the augmentation message generated by the processing module 401 and the positioning information transmitted by the stations RIMS B. If the discrepancy between these two items of positioning information is too significant, the monitoring function 421 communicates with the function 412 for elaborating the augmentation message so as to inform it of the invalidity of the data concerned. In practice when an anomaly is detected by the monitoring function 421, this culminates in the invalidation of all the measurements provided by one and the same satellite or arising from signals originating from a given zone of the ionosphere. The monitoring carried out by the module 402 therefore entails a reduction in availability in respect of the global SBAS system since certain satellites or certain zones of the ionosphere will be rendered unutilizable.

Figure 5:
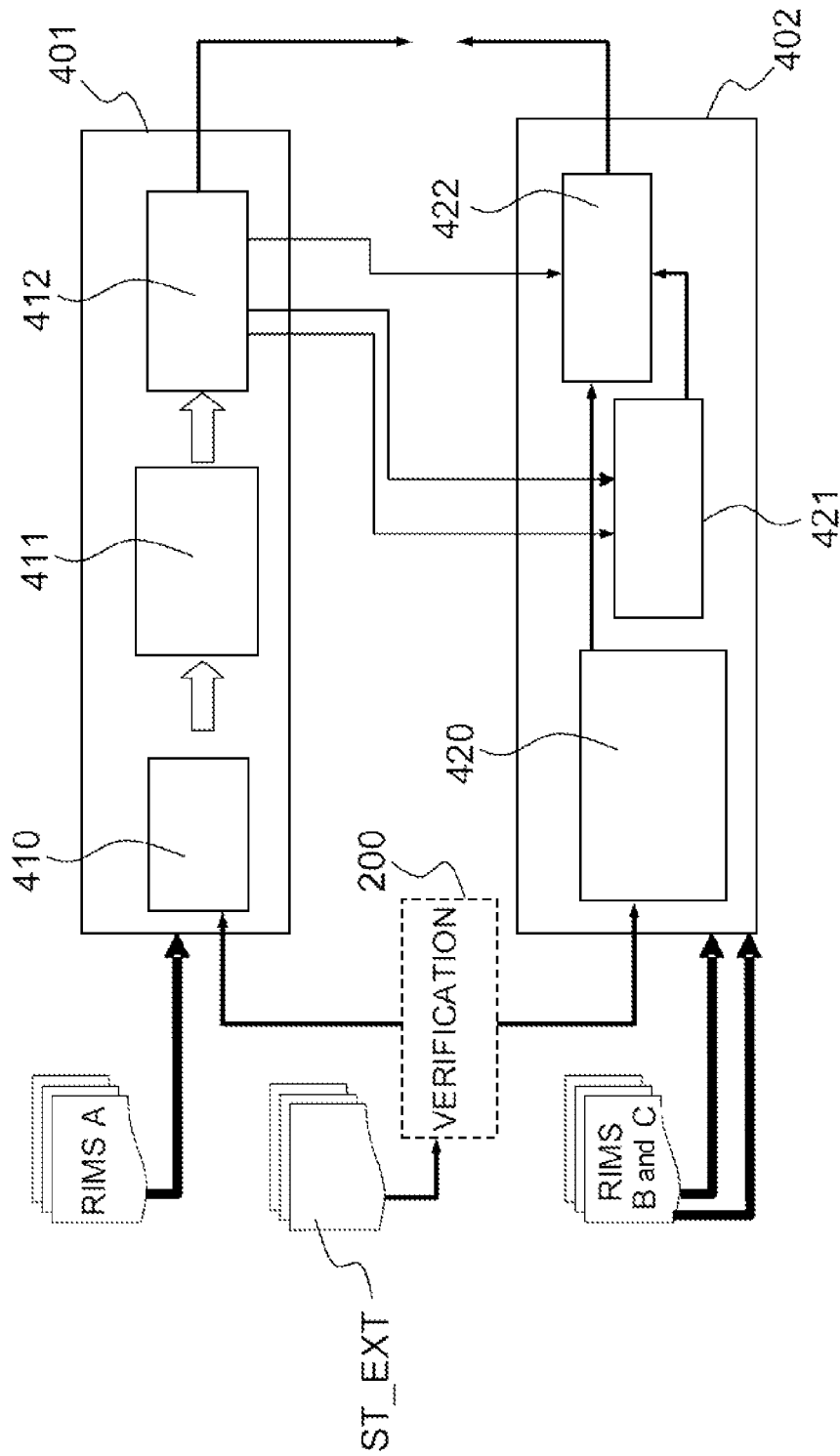

FIG. 5 represents the monitoring and processing centre CPF of FIG. 4 into which is inserted, upstream of the customary processings, a verification module 200 making it possible to monitor the integrity of the measurements transmitted by the stations ST_EXT external to the system.

Figure 6:
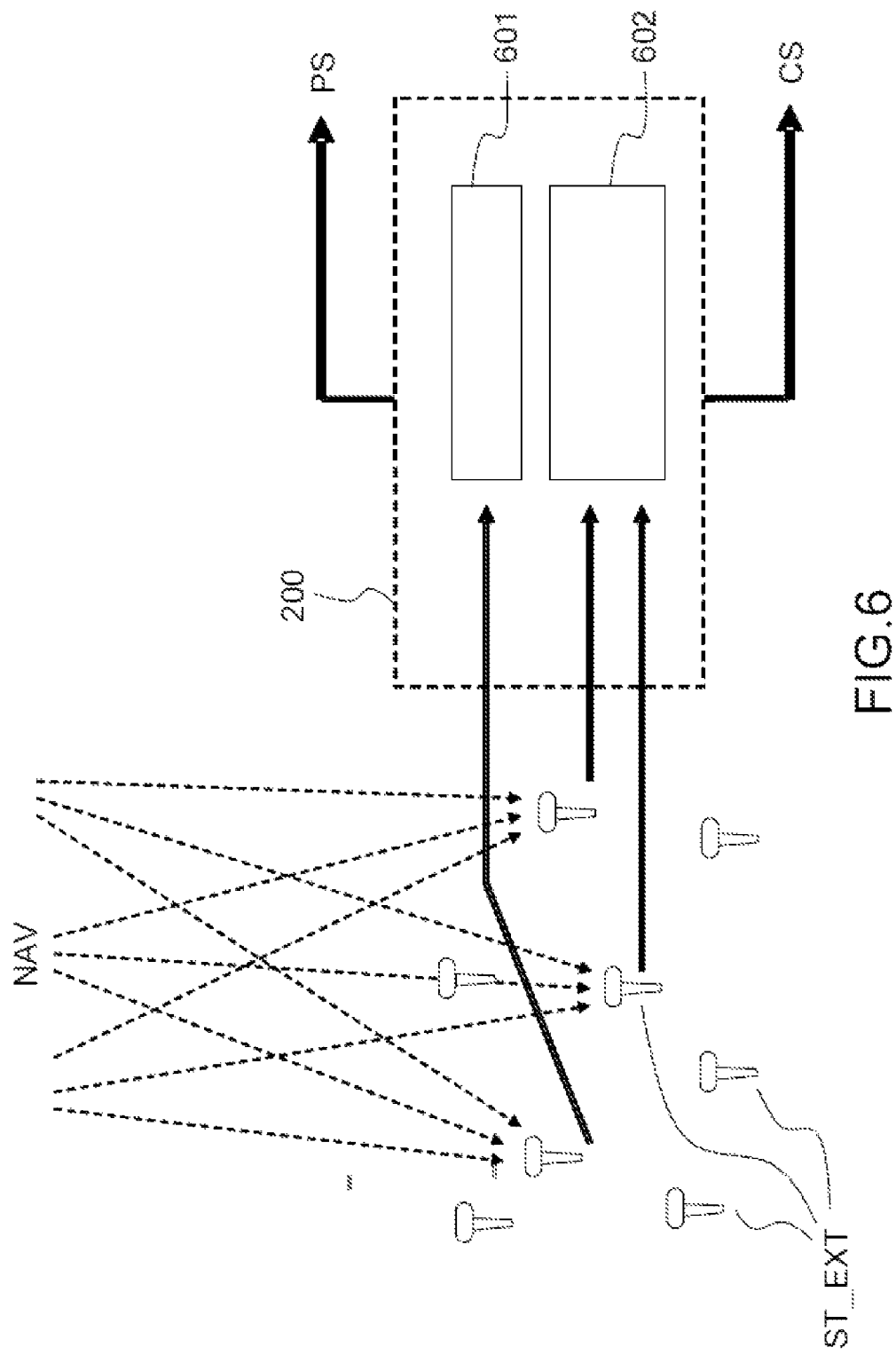

FIG. 6 illustrates the method implemented by the verification module 200.

For each line of sight between a station ST_EXT and a satellite NAV, a theoretical pseudo-distance D and a measured pseudo-distance D' are calculated. The theoretical pseudo-distance D is equal to the geometric distance between the position of the satellite NAV and the actual position of the station ST_EXT. The position of the satellite is provided in the navigation message transmitted, according to the embodiment of the invention by the observation stations RIMS or by the return pathway of the terrestrial navigation station NLES. The actual positions of the stations ST_EXT are known and broadcast by the cooperative body, for example the body RGP, which manages the network of stations. The measured pseudo-distance D' is that which is transmitted by the external station ST_EXT to the processing centre CPF.

The discrepancy D'−D between the theoretical and measured pseudo-distances is calculated, it corresponds to the measurement error on a line of sight between a station and a satellite. This measurement error comprises various contributions such as illustrated by the following equation:

$$D_m = D + \delta d + c(h_e - h_r) + e_T + e_i + e_m + e_b$$

$D_m$ is the measured distance,
D is the actual distance,
$\delta d$ is the error in the ephemerides,
$c(h_e - h_r)$ is the satellite and receiver clock error,
$e_T$ is the tropospheric propagation error,
$e_i$ is the ionospheric propagation error,
$e_m$ is the error related to multi-paths,
$e_b$ is the error related to measurement noise.

The integrity monitoring according to the invention makes it possible to isolate the errors specific to the station and to its near environment, that is to say the receiver clock errors related to tropospheric propagation and to multi-paths. Indeed, the errors related to the satellites or to ionospheric propagation are common for all the receivers of one and the same geographical zone. Conversely, the errors related to the receivers or to their near environment impact only certain receivers within a given zone.

In a first step 601, the verification module 200 according to the invention calculates the average m of the discrepancies D'−D between theoretical and measured pseudo-distances for a number N of external stations situated in a geographical zone Z and for a number $S_i$ of satellites in visibility.

This average is calculated with the aid of the following relation:

$$m = \frac{1}{N} \sum_{i=1}^{N} \frac{1}{S_i} \sum_{j=1}^{S_i} (D_{i,j} - D'_{i,j}), \quad (1)$$

where $D_{i,j}$ is the theoretical pseudo-distance between a station i and a satellite j and $D'_{i,j}$ is the measured pseudo-distance.

In a second step 602, the stations identified as unreliable are excluded. Stated otherwise, the stations for which the discrepancy $D_{i,j} - D'_{i,j}$ is much greater than the average m are excluded. More precisely, a test of comparison is performed between the ratio of the discrepancy $D_{i,j} - D'_{i,j}$ and of the average m with a predetermined exclusion threshold.

The average calculation hereinabove can be carried out for the set of line of sight of the stations of one and the same zone Z stated otherwise for the set of satellites in visibility of this zone. In this case, the measured pseudo-distances $D'_{i,j}$ can be pre-corrected of the errors related to the satellite or to the propagation of the signals in the ionosphere by applying known schemes and with the aim of eliminating from the exclusion criterion the defects related to the far environment of the stations.

In particular it is possible to pre-correct the ephemerides errors by using the corrections provided in the SBAS augmentation message, but also the ionospheric errors by using a modelling of the ionosphere or else the satellite clock errors.

In the case where the measured pseudo-distances are not pre-corrected to eliminate the influence of the satellites and more generally of the far environment of a station, the calculation of the average m can also be carried out for each line of sight separately. Relation (1) then reduces to the following relation:

$$m_j = \frac{1}{N}\sum_{i=1}^{N}(D_i - D'_i)$$

The comparison test of step 602 is then carried out for each line-of-sight separately. A station for which the discrepancy $D_i-D'_i$ is much greater than the average $m_j$ for at least one satellite j is excluded.

The choice of the number N of stations to be taken into account for the average calculation and/or the choice of the geographical mesh making it possible to define the zones in which these stations are situated can be defined according to several variants. This choice results from several compromises. Firstly, the more significant the number N of stations taken into account for the calculation of the average m the more statistically reliable the calculation. Moreover, it is considered that the stations situated in one and the same geographical zone are in visibility of the same satellites and are impacted by common exterior error sources. It is for this reason that the discrepancy between theoretical and measured pseudo-distance exhibits an identical or close value for the stations situated in a close geographical environment. The choice of the geographical mesh must take into account the two aforementioned constraints, a sufficient number of stations per zone to obtain a coherent statistical result but a sufficiently small zone size so that the set of stations of this zone are impacted by common exterior error sources. The expression exterior error source is understood to mean an error source related to a satellite or to an environment far removed from a station. These mainly entail the malfunction errors of the station itself, for example clock errors, but also those related to the near environment that is to say propagation errors related to multi-paths or to the troposphere.

Figure 7:
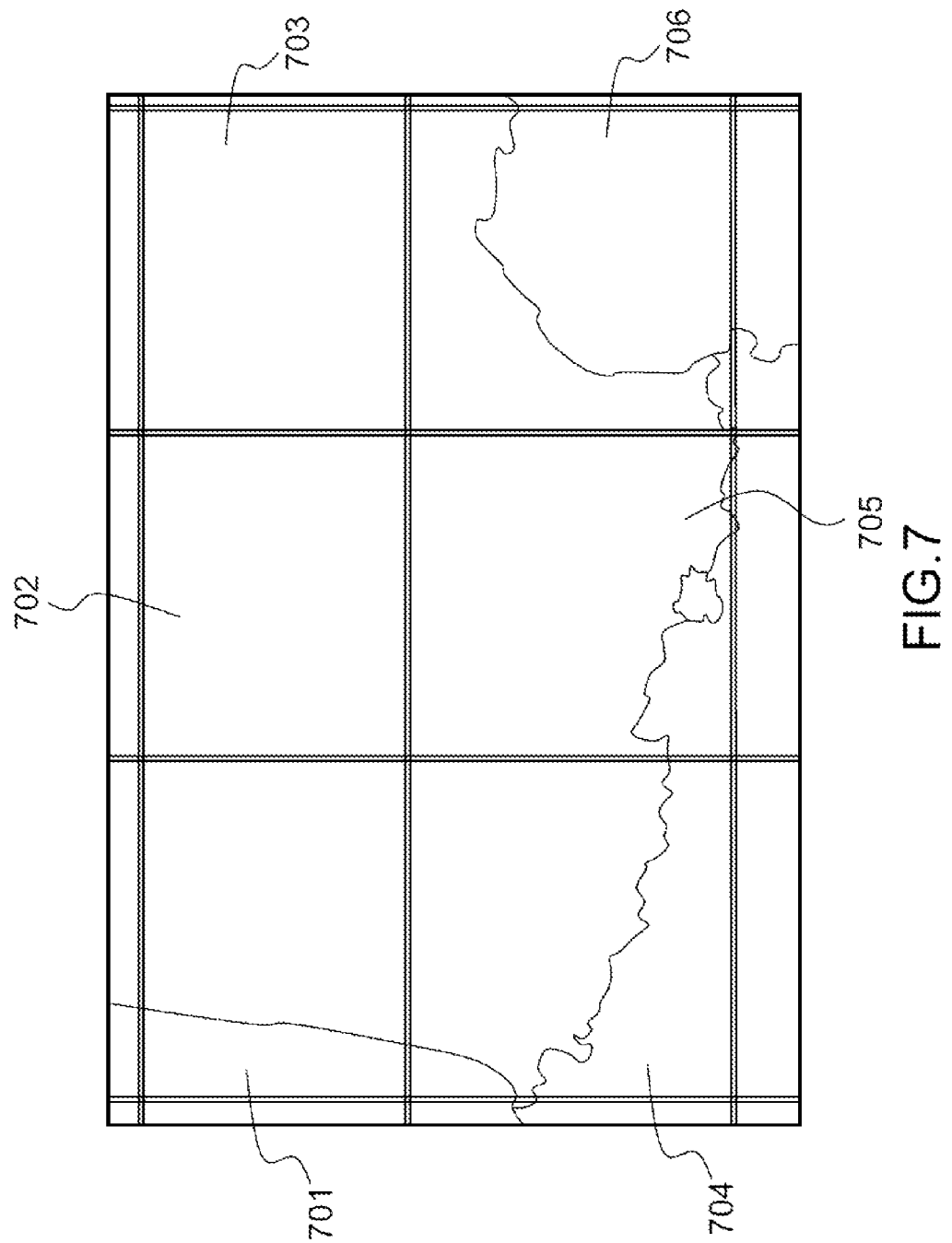

According to a first variant of the invention illustrated in FIG. 7, the geographical zone containing the set of external stations ST_EXT to be utilized can be cut up into sub-zones 701,702,703,704,705,706 of identical shapes and sizes, for example rectangular. The number of stations per sub-zone is then variable.

FIG. 8 shows diagrammatically the principle of excluding the external stations whose reliability is not guaranteed for the definition of sub-zones according to the first variant of the invention.

The measurements of discrepancies D-D' obtained for each station are represented on a two-dimensional chart (latitude $\phi$, longitude $\lambda$). The calculated average m is also positioned as is the radius R around this average corresponding to the predefined exclusion threshold. The stations 801,802,803, 804,805 whose measurements of discrepancies D-D' are greater than the radius R are excluded.

The principle described can apply in respect of the set of lines of sight between a station and several satellites or in respect of a subset of these lines of sight.

The exclusion threshold may be fixed or dependent on the number of values that it is desired to exclude. It can be adjusted in an empirical manner with the aid of simulation scenarios. For example, the simulation scheme making it possible to configure this threshold can consist of an initial adjustment of the threshold to a high value so as to limit the number of excluded stations. The threshold can initially be adjusted so as to exclude only 10% of the stations of a zone at the maximum. Next, simulation scenarios are implemented by simulating the impact of various types of errors on the external stations. The exclusion threshold is thereafter adjusted so as to minimize at one and the same time the number of improper exclusions, stated otherwise the probability of false alarm, and the number of missed exclusions, stated otherwise the probability of non-detection.

Figure 9:
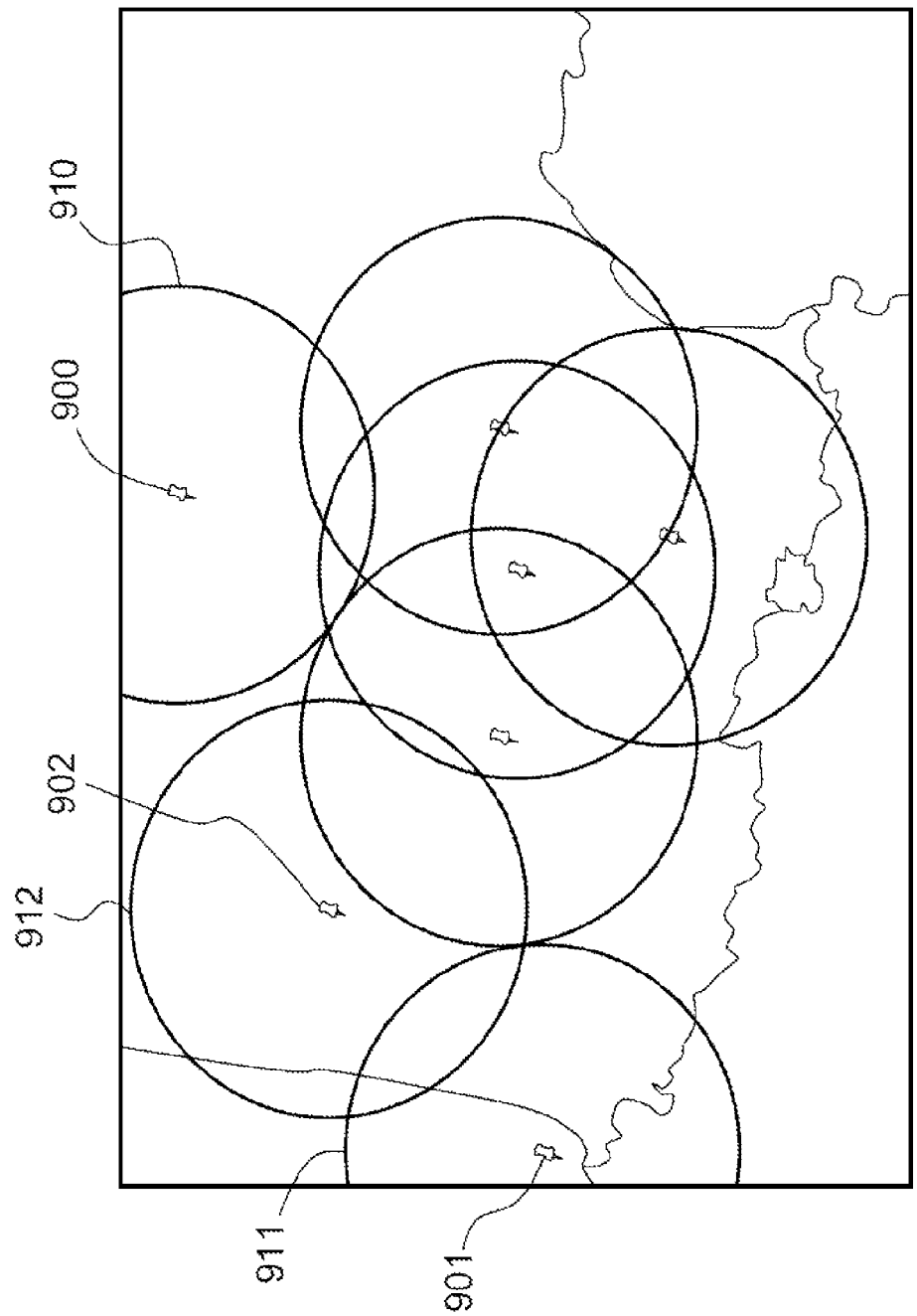
Figure 10:
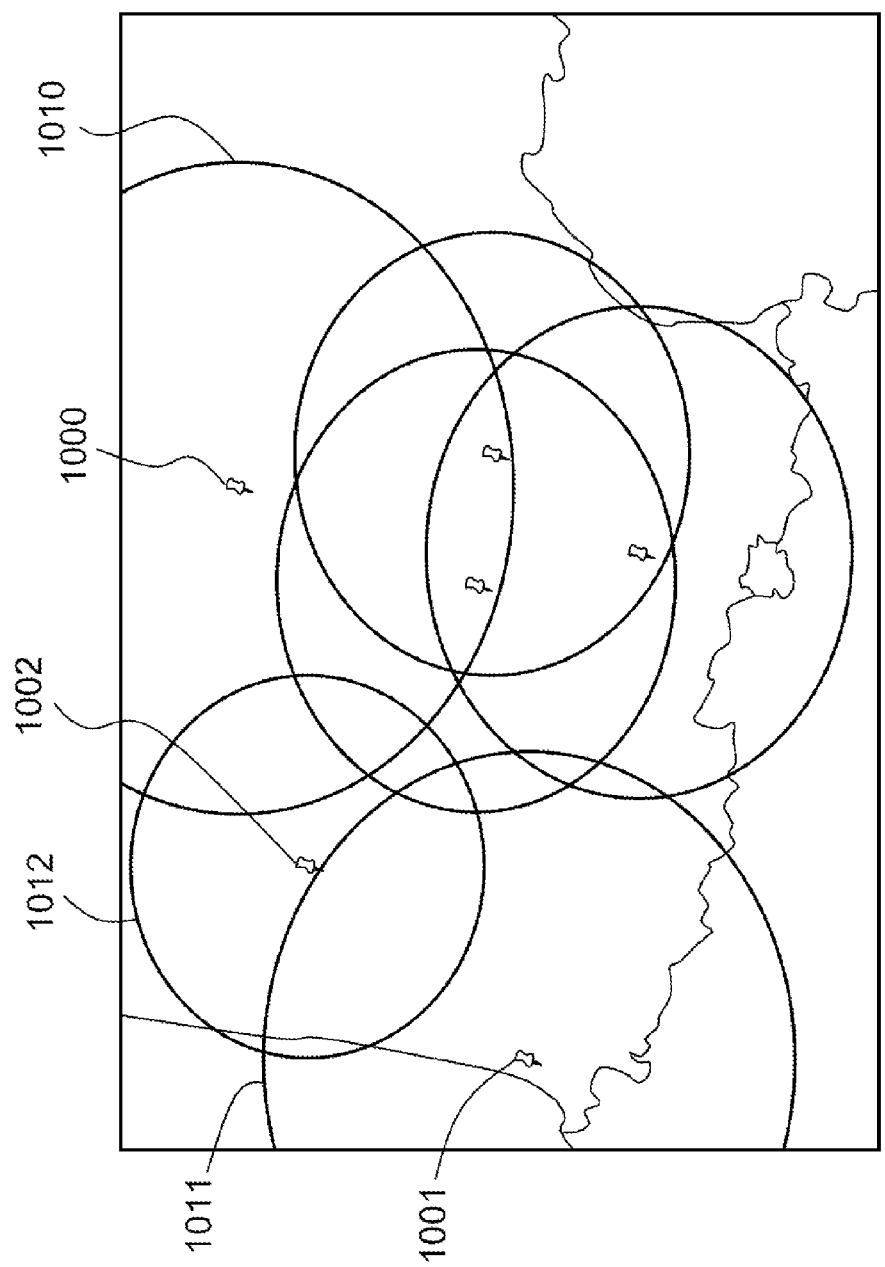

FIGS. 9 and 10 illustrate two examples of definition of sub-zones appropriate to the implementation of a second variant of the invention.

According to the example illustrated in FIG. 9, a sub-zone can be defined on the basis of a central reference station 900,901,902 and of a circle 910,911,912 of fixed predetermined radius for all the zones. The sub-zones constructed are better adapted to the geographical mesh of the stations but the number N of stations per sub-zone is still variable.

According to the example illustrated in FIG. 10, the radius of the circles 1010,1011,1012 defining a sub-zone around a central reference station 1000,1001,1002 can be variable so as to take into account the differences in density of geographical distribution of the stations. The radius of the circles is determined so that each sub-zone includes one and the same number N of stations. In the example of FIG. 10, each zone contains a number N equal to 10 stations.

FIG. 11 shows diagrammatically the principle of excluding the external stations whose reliability is not guaranteed for the definition of sub-zones according to the second variant of the invention.

For each sub-zone associated with each reference station 1100 such as defined according to one of the examples in the choice of FIG. 9 or 10, the average m of the discrepancies D-D' is thus calculated as the radius R around this average corresponding to the predefined exclusion threshold. If the reference station 1100 is situated outside of the circle of radius R, then this station and only the latter is excluded.

This second variant of the invention makes it possible to refine the precision of the calculations carried out since it comprises potentially as many sub-zones as external stations. The first variant of the invention exhibits for its part the advantage of limiting the number of sub-zones and therefore the number of calculations to be performed.

The invention claimed is:
1. A method for monitoring the integrity of stations for observing radio-navigation signals in a satellite based augmentation system SBAS comprising:
defining at least one geographical zone comprising a plurality of observation stations,
calculating, for each observation station of the said zone and for each line of sight between the said station and a satellite, the discrepancy between a theoretical pseudo-distance D and a measured pseudo-distance D', calculating the average m of the said discrepancies D−D' over the said zone for at least one satellite in visibility of the said zone, validating the integrity of at least one observation station of the said zone if the discrepancy between the theoretical pseudo-distance D and the measured pseudo-distance D', for the said station and for at least one line of sight between the said station and a satellite, is less than or equal to the said average that is multiplied by a predetermined exclusion threshold, and excluding this observation station in the converse case.

2. The method for monitoring the integrity of stations for observing radio-navigation signals according to claim 1, wherein the said average m is calculated over the set of the satellites in visibility of a said zone.

3. The method for monitoring the integrity of stations for observing radio-navigation signals according to claim 2, wherein the integrity of the observation stations of the said zone is validated if all the discrepancies between theoretical pseudo-distance D and measured pseudo-distance D' for all the lines of sight are less than or equal to the said average that is multiplied by a predetermined exclusion threshold.

4. The method for monitoring the integrity of stations for observing radio-navigation signals according to claim 1, wherein the theoretical pseudo-distance D is calculated on the basis of the knowledge of the positions of the satellites and of the observation stations and the measured pseudo-distance D' is calculated by the observation stations on the basis of the received radio-navigation signals.

5. The method for monitoring the integrity of stations for observing radio-navigation signals according to claim 1, wherein the said zone has a fixed size.

6. The method for monitoring the integrity of stations for observing radio-navigation signals according to claim 1, wherein the said zone is a circle of variable radius centred on a given observation station, termed the reference station.

7. The method for monitoring the integrity of stations for observing radio-navigation signals according to claim 6, wherein the radius of the said zone is configured so that each zone comprises the same number N of stations.

8. The method for monitoring the integrity of stations for observing radio-navigation signals according to claim 1, wherein, within a zone, only the integrity of the reference station is validated.

9. The method for monitoring the integrity of stations for observing radio-navigation signals according to claim 1, in which the exclusion threshold is fixed or dependent on the maximum number of observation stations per zone to be excluded.

10. The method for monitoring the integrity of stations for observing radio-navigation signals according to claim 1, wherein the exclusion threshold is configured so as to minimize the probability of false alarm and the probability of non-detection over the number of excluded observation stations.

11. The method for monitoring the integrity of stations for observing radio-navigation signals according to claim 1, in which the said observation stations form part of a collaborative network of stations.

12. A monitoring and processing centre for satellite based augmentation system SBAS comprising means, including a processor, for monitoring the integrity of stations for observing radio-navigation signals, said means being configured for defining at least one geographical zone comprising a plurality of observation stations, calculating, for each observation station of the said zone and for each line of sight between the said station and a satellite, the discrepancy between a theoretical pseudo-distance D and a measured pseudo-distance D', calculating the average m of the said discrepancies D−D' over the said zone for at least one satellite in visibility of the said zone, validating the integrity of at least one observation station of the said zone if the discrepancy between the theoretical pseudo-distance D and the measured pseudo-distance D', for the said station and for at least one line of sight between the said station and a satellite, is less than or equal to the said average that is multiplied by a predetermined exclusion threshold, and excluding this observation station in the converse case.

13. A satellite based augmentation system SBAS comprising a plurality of observation stations whose integrity is not guaranteed and at least one monitoring and processing centre according to claim 12.

* * * * *